United States Patent
Cho et al.

(10) Patent No.: US 10,012,787 B2
(45) Date of Patent: Jul. 3, 2018

(54) LIQUID CRYSTAL DISPLAY COMPRISING K-SI-F-BASED PHOSPHORS AND COLOR GAMUT ENHANCING FILM

(71) Applicant: SKC HI-TECH & MARKETING CO., LTD., Chungcheongnam-do (KR)

(72) Inventors: Hong Youl Cho, Chungcheongnam-do (KR); Kyoo Choong Cho, Gyeonggi-do (KR); Hyun Cheol Nam, Chungcheongnam-do (KR)

(73) Assignee: SKC HI-TECH & MARKETING CO., LTD., Chungcheongnam-Do (KR)

(*) Notice: Subject to any disclaimer, the term of this patent is extended or adjusted under 35 U.S.C. 154(b) by 0 days.

(21) Appl. No.: 15/468,821

(22) Filed: Mar. 24, 2017

(65) Prior Publication Data
US 2017/0285247 A1 Oct. 5, 2017

(30) Foreign Application Priority Data
Apr. 1, 2016 (KR) .................. 10-2016-0040311

(51) Int. Cl.
F21V 8/00 (2006.01)
G02F 1/1335 (2006.01)
G02B 1/10 (2015.01)

(52) U.S. Cl.
CPC ............ G02B 6/0053 (2013.01); G02B 1/10 (2013.01); G02B 6/0051 (2013.01); G02F 1/133514 (2013.01); G02F 1/133528 (2013.01); G02F 1/133615 (2013.01); G02F 1/133617 (2013.01); G02F 2001/133507 (2013.01); G02F 2001/133614 (2013.01); G02F 2201/52 (2013.01); G02F 2202/04 (2013.01); G02F 2202/28 (2013.01)

(58) Field of Classification Search
CPC ......... G02F 1/133617; G02F 1/133514; G02F 1/133528; G02B 6/0051
See application file for complete search history.

(56) References Cited

U.S. PATENT DOCUMENTS

| | | | |
|---|---|---|---|
| 8,907,558 B2 | 12/2014 | Hiramatsu et al. | ........... 313/503 |
| 2004/0141700 A1 | 7/2004 | Yang | ............ 385/120 |
| 2013/0307011 A1 | 11/2013 | Yamakawa et al. | ........... 257/98 |

(Continued)

FOREIGN PATENT DOCUMENTS

| | | | |
|---|---|---|---|
| JP | 2009-251511 | 10/2009 | |
| JP | 2010-093132 | 4/2010 | ........... H01L 33/48 |

(Continued)

OTHER PUBLICATIONS

Taiwanese Office Action from corresponding Taiwan Patent Application No. 106105182 dated Jul. 7, 2017.

(Continued)

*Primary Examiner* — Dung Nguyen
(74) *Attorney, Agent, or Firm* — Harness, Dickey & Pierce, P.L.C.

(57) ABSTRACT

The present disclosure relates to a liquid crystal display comprising K—Si—F-based phosphors and a color gamut enhancing film, wherein the liquid crystal display of the present invention can improve a color gamut by transmitting pure RGB wavelengths emitted from a light source as much as possible and absorbing unnecessary wavelengths other than the RGB wavelengths.

15 Claims, 8 Drawing Sheets

(56) References Cited

U.S. PATENT DOCUMENTS

| | | | | |
|---|---|---|---|---|
| 2015/0268492 A1 | 9/2015 | Hi No et al. | .......... | G02F 1/1336 |
| 2015/0369988 A1* | 12/2015 | Hsu | ....................... | G02B 6/005 |
| | | | | 349/61 |
| 2015/0380613 A1* | 12/2015 | Hiramatsu | ........... | C09K 11/617 |
| | | | | 257/98 |
| 2016/0093776 A1 | 3/2016 | Setlur et al. | .......... | H02L 33/502 |
| 2016/0349432 A1* | 12/2016 | Huang | ................... | G02B 6/005 |

FOREIGN PATENT DOCUMENTS

| | | | | |
|---|---|---|---|---|
| JP | 2010-134349 | 6/2010 | ........... | G02F 1/1335 |
| JP | 2011-039093 | 2/2011 | | |
| JP | 2011-221376 | 11/2011 | | |
| JP | 2013-189588 | 9/2013 | | |
| JP | 5823416 | 10/2015 | ............. | H01L 33/50 |
| JP | 2016-008998 | 1/2016 | | |
| KR | 10-2004-0065137 | 7/2004 | ......... | G02F 1/13357 |
| KR | 10-2015-0039300 | 4/2015 | ............. | H01L 51/52 |
| KR | 2015-0082426 | 7/2015 | ........... | H01L 25/075 |
| TW | 201538681 | 10/2015 | ............. | C09K 11/06 |
| WO | WO 2011/077742 | 6/2011 | | |

OTHER PUBLICATIONS

Korean Office Action from corresponding Korean Patent Application No. 10-2016-0040311 dated Sep. 7, 2017.
Japanese Office Action from corresponding Japanese Patent Application No. 2017-020662 dated Oct. 24, 2017.

\* cited by examiner

लिक्विड क्रिस्टल

# LIQUID CRYSTAL DISPLAY COMPRISING K-SI-F-BASED PHOSPHORS AND COLOR GAMUT ENHANCING FILM

CROSS REFERENCES TO RELATED APPLICATIONS

The present application claims benefit of and priority to Korean Patent Application No. 10-2016-0040311, filed in the Korean Patent Office on Apr. 1, 2016, the entire contents of which are incorporated herein by reference.

FIELD

The present invention relates to a liquid crystal display in which an enhancement of color gamut is maximized by comprising a K—Si—F-based phosphors and a color gamut enhancing film.

BACKGROUND

In the past, 40-inch (") class TVs were prevalent, but many consumers now purchase 50" class TVs and even 60" class TVs. While the size competition was over, resolution competition has begun. Even a year ago, full high definition (FHD) class TVs belonged to an advanced model, but ultra HD (UHD) TVs now have been rapidly spread on the market.

Recently, the display market has evolved from large-area, high-resolution competition to color competition. For this reason, competition for the production of a display with excellent color has recently emerged.

A liquid crystal display displays an image by using optical properties of liquid crystals, wherein, since a liquid crystal panel displaying the image is a non-emissive device or not self-luminous, the liquid crystal display has a structure comprising the liquid crystal panel as well as a back-light unit which is disposed on a rear surface of the liquid crystal panel to provide light to the liquid crystal panel. Although the liquid crystal display is in the spotlight as a display device used in mobile devices, computer monitors, and high-definition televisions (HDTVs), the liquid crystal display is somewhat inferior to other types of displays in terms of color.

Recently, the employment of a red phosphor comprising a K—Si—F-based phosphors in a light emitting device package is most actively tried among various solutions suggested for realizing a high-quality color reproduction display (see Korean Laid-open Patent Publication No. 2015-0082426 and Japanese Laid-open Patent Publication No. 2010-93132). However, under the circumstances that a picture quality standard has been changed for UHD broadcast, a color reproduction level achievable by the application of the K—Si—F-based phosphors in the light emitting device package is insufficient for the new standard.

Thus, there is a need to develop a new technique which may dramatically improve a color gamut of a conventional LCD to the level of the new standard.

SUMMARY

The present disclosure is to provide a liquid crystal display which may maximize an enhancement of color gamut of the liquid crystal display by transmitting pure red, green and blue (RGB) wavelengths emitted from a light source as much as possible and blocking unnecessary wavelengths other than the RGB wavelengths.

In an embodiment, the present invention provides a liquid crystal display comprising a backlight unit and a liquid crystal panel, wherein the backlight unit comprises a white emitting device package comprising K—Si—F-based phosphors, and the backlight unit, the liquid crystal panel, or both of the backlight unit and the liquid crystal panel comprise one or more of a coating layer or an adhesive, wherein the one or more of the coating layer or the adhesive layer comprise at least one type of an absorption dye configured to absorb a specific wavelength band.

Advantageous Effects

According to the present invention, since at least one type of an absorption dye configured to absorb a specific wavelength band is introduced into an adhesive layer or a coating layer of a liquid crystal display and K—Si—F-based phosphors are applied to a light emitting device package, a color gamut can be enhanced by transmitting pure RGB wavelengths emitted from a light source as much as possible and blocking unnecessary wavelengths other than the RGB wavelengths, and thus, it is possible to manufacture a liquid crystal display in which the enhancement of the color gamut is maximized.

DETAILED DESCRIPTION

A liquid crystal display of the present invention comprises a backlight unit and a liquid crystal panel, wherein the backlight unit comprises a white emitting device package comprising K—Si—F-based phosphors, and the backlight unit, the liquid crystal panel, or both of the backlight unit and the liquid crystal panel comprise one or more of a coating layer or an adhesive layer in configurations thereof where the one or more of the coating layer or the adhesive layer comprise at least one type of an absorption dye configured to absorb a specific wavelength band.

Figure 1:
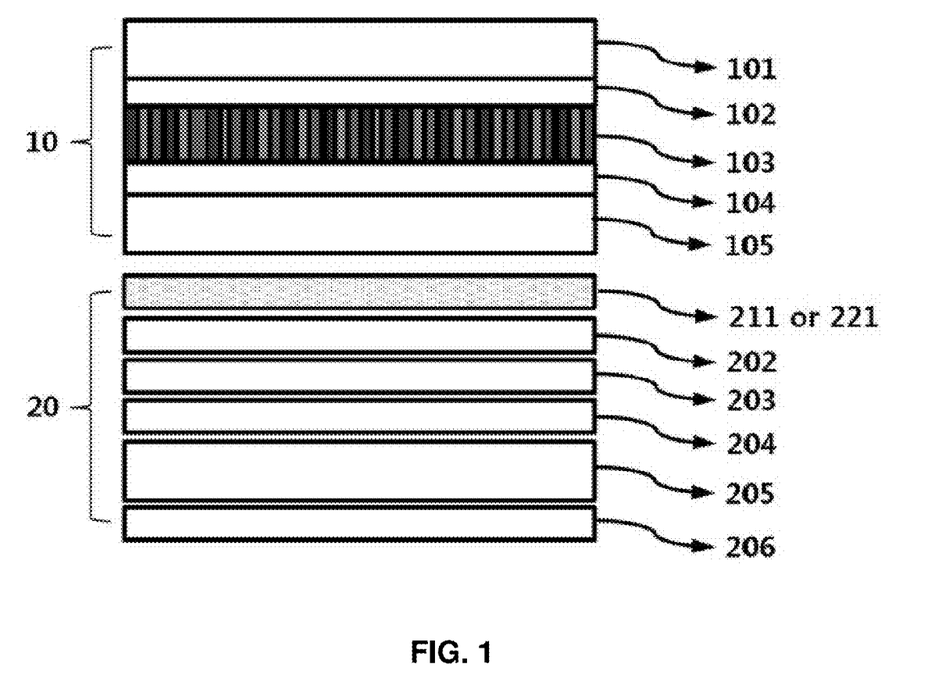
FIG. 1 is a schematic view illustrating a structure of a liquid crystal display according to an embodiment of the present invention.
Figure 2A:
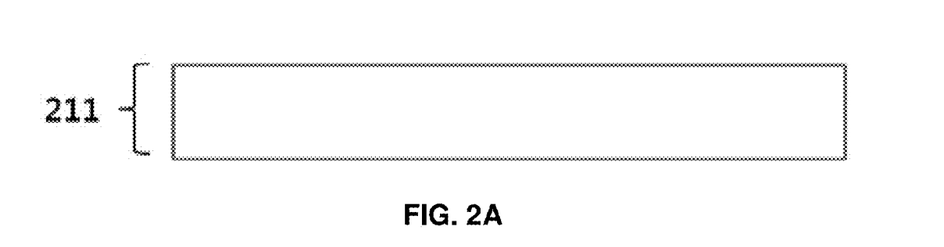
FIGS. 2A, 2B, 2C, and 2D are schematic views respectively illustrating structures of a dual brightness enhancement film, a diffusion sheet, a horizontal prism sheet, and a reflective plate.
Figure 2B:
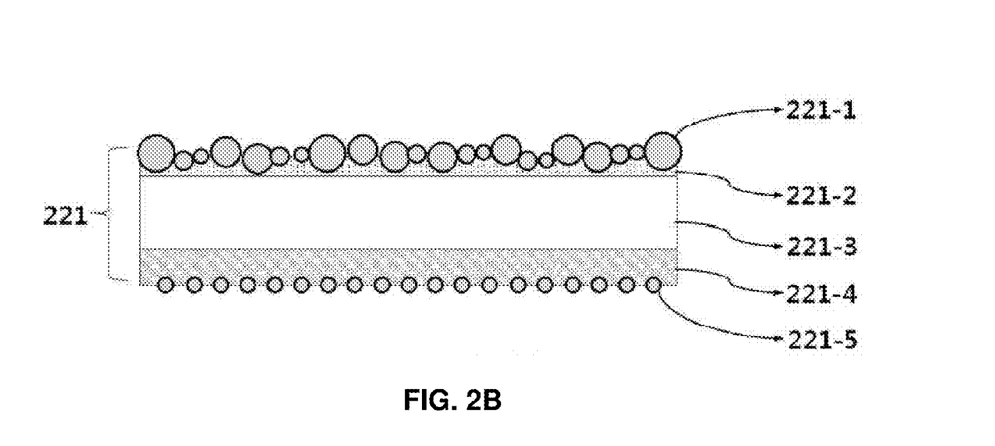
Figure 2C:
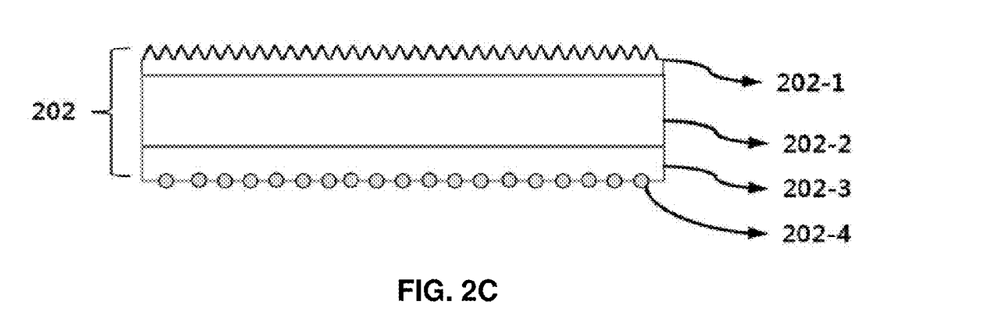
Figure 2D:
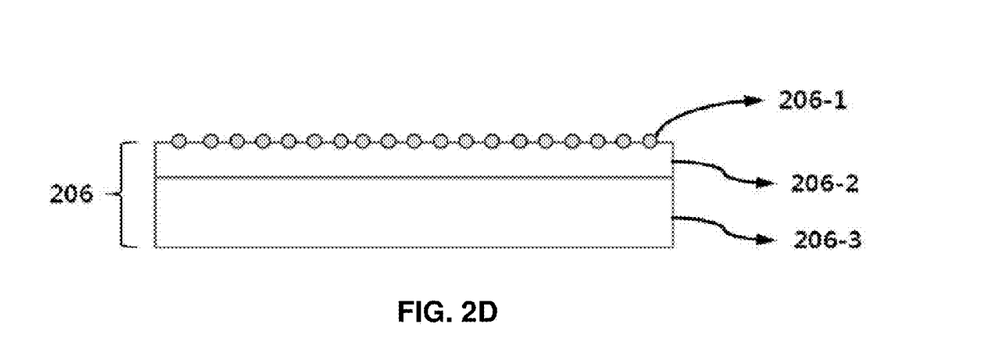

A structure of a liquid crystal display according to an embodiment of the present invention is illustrated in FIG. 1.

Referring to FIG. 1, a liquid crystal panel 10 may comprise an upper polarizing plate 101, a first adhesive layer 102, a liquid crystal cell 103, a second adhesive layer 104, and a lower polarizing plate 105 in a sequentially stacked form, and a backlight unit 20 may sequentially comprise at least two selected from the group consisting of a dual brightness enhancement film (DBEF) 211 or an upper diffusion sheet 221, a horizontal prism sheet 202, a vertical prism sheet 203, a lower diffusion sheet 204, a light guide plate 205, and a reflective plate 206.

Also, referring to FIGS. 2A to 2D, the dual brightness enhancement film 211 may have a multilayer structure (not shown in the drawings), and the upper diffusion sheet 221 may comprise a diffusion coating layer 221-2 having first beads 221-1 on one side of a diffusion sheet base material 221-3 and may comprise a bead coating layer 221-4 for preventing wet-out, which has second beads 221-5 on the opposite side thereof. Furthermore, the horizontal prism sheet 202 may comprise a prism pattern layer 202-1 on one side of a prism sheet base material 202-2 and may comprise a rear coating layer 202-3 having third beads 202-4 on the opposite side thereof. In addition, the vertical prism sheet 203 may also have the same layer configuration as the horizontal prism sheet 202. In addition, the lower diffusion sheet 204 may have the same configuration as the upper diffusion sheet 221. Also, the reflective plate 206 may comprise a front coating layer 206-2 having fourth beads 206-1 on one side of a reflective plate base material 206-3.

However, the structure of the liquid crystal display of the present invention is not limited thereto, but may be variously modified, if necessary.

When the basic principle of a liquid crystal display is examined, while light emitted from a light source is guided in a direction of a liquid crystal panel through a light guide plate and then passes through a light diffusion sheet, the light is diffused in vertical/horizontal directions to the surface thereof and light luminance is rapidly decreased. Since outgoing of the light from the light diffusion sheet in a direction other than a front light exit surface is prevented by passing the light through a prism sheet and light directivity is improved to narrow a viewing angle, brightness in a direction of the front light exit surface of backlight is increased. In this case, if a separate sheet, such as a dual brightness enhancement film, is used in a backlight unit, the increase in the brightness may be maximized by light recycling.

According to the present invention, the backlight unit, the liquid crystal panel, or both of the backlight unit and the liquid crystal panel comprise a coating layer or an adhesive layer comprising at least one type of an absorption dye configured to absorb a specific wavelength band in configurations thereof.

The liquid crystal panel sequentially comprises the upper polarizing plate, the first adhesive layer, the liquid crystal cell, the second adhesive layer, and the lower polarizing plate; and the first adhesive layer, the second adhesive layer, or both of them may comprise at least one type of an absorption dye configured to absorb a specific wavelength band. For example, the adhesive layer may be formed by wet-coating on one side or both sides of the upper polarizing plate or the lower polarizing plate.

A thickness of the adhesive layer may be in a range of 2 μm to 100 μm, 5 μm to 100 μm, or 5 μm to 25 μm.

Also, the adhesive layer may comprise a pressure-sensitive adhesive. For example, the pressure-sensitive adhesive may comprise, at least one adhesive selected from the group consisting of an acryl-based adhesive, a urethane-based adhesive, an epoxy-based adhesive, and a silicone-based adhesive. Specifically, the pressure-sensitive adhesive may be an acryl-based adhesive.

The backlight unit sequentially comprises at least two selected from the group consisting of a dual brightness enhancement film (DBEF) or an upper diffusion sheet, a prism sheet, a lower diffusion sheet, a light guide plate, and a reflective plate, and comprises a coating layer on at least one position of one side or both sides of the dual brightness enhancement film or the upper diffusion sheet, one side or both sides of the prism sheet, one side or both sides of the lower diffusion sheet, one side or both sides of the light guide plate, and one side of the reflective plate, wherein the coating layer may comprise at least one type of an absorption dye configured to absorb a specific wavelength band. For example, the coating layer may be formed by wet-coating on one side or both sides of the dual brightness enhancement film or the upper diffusion sheet, one side or both sides of the prism sheet, one side or both sides of the lower diffusion sheet, one side or both sides of the light guide plate, or one side (i.e., light guide plate facing side) of the reflective plate.

The prism sheet may comprise a horizontal prism sheet, a vertical prism sheet, or a combination thereof.

A thickness of the coating layer may be in a range of 1 μm to 100 μm, 2 μm to 100 μm, or 2 μm to 15 μm.

The coating layer may comprise a binder resin. The binder resin may comprise, for example, at least one resin selected from the group consisting of a polyester-based binder resin, an acryl-based binder resin, a polyurethane-based binder resin, a melamine-based binder resin, a polyvinyl alcohol-based binder resin, and an oxazoline-based binder resin. Specifically, the binder resin may be an acryl-based binder resin.

The adhesive layer and/or the coating layer comprising the absorption dye is referred to as a color gamut enhancing film, and, since luminous color gamut and brightness loss of the liquid crystal display may change according to a position of the color gamut enhancing film, particularly a position of the coating layer, the position may be adjusted appropriately, if necessary.

Also, the absorption dye may be a combination of at least one absorption dye having a main absorption wavelength band other than RGB. Specifically, the absorption dye may have a main absorption wavelength band of 380 nm to 430 nm, 480 nm to 510 nm, or 560 nm to 600 nm. For example, the absorption dye blocking a wavelength band of 380 nm to 430 nm may comprise a hydroxy benzotriazole (HB)-based absorption dye, a tris-resorcinol-triazine chromophore (TRTC)-based absorption dye, and a hydroxylphenyl-benzotriazole chromophore (HBC)-based absorption dye; the absorption dye blocking a wavelength band of 480 nm to 510 nm may comprise a pyrrole methine (PM)-based absorption dye, a rhodamine (RH)-based absorption dye, and a boron dipyrromethene (BODIBY)-based absorption dye; and the absorption dye blocking a wavelength band of 560 nm to 600 nm may comprise a tetraaza porphyrin (TAP)-based absorption dye, a rhodamine-based absorption dye, a squarine (SQ)-based absorption dye, and a cyanine (CY)-based absorption dye.

The absorption dye may be selected from the group consisting of a hydroxy benzotriazole (HB)-based dye, a tris-resorcinol-triazine chromophore (TRTC)-based dye, a hydroxylphenyl-benzotriazole chromophore (HBC)-based dye, a pyrrole methine-based dye, a rhodamine-based dye, a boron dipyrromethene-based dye, a tetraaza porphyrin-based dye, a squarine-based dye, and a cyanine-based dye. Specifically, the absorption dye may be selected from the group consisting of the hydroxy benzotriazole-based dye, the cyanine-based dye, the pyrrole methine-based dye, and the tetraaza porphyrin-based dye. More specifically, the absorption dye may be a combination of the hydroxy benzotriazole-based dye, the cyanine-based dye, and the tetraaza porphyrin-based dye.

The absorption dye may be comprised in an amount of 0.01 wt % to 10 wt % based on the total weight of the coating layer or the adhesive layer. Specifically, the absorption dye may be comprised in an amount of 0.05 wt % to 7 wt % based on the total weight of the coating layer or the adhesive layer.

The adhesive layer and the coating layer may further comprise an ultraviolet screening agent for screening UV light. The ultraviolet screening agent absorbs (or blocks) light having a wavelength of 430 nm or less, and, for example, the hydroxy benzotriazole (HB)-based ultraviolet screening agent, the tris-resorcinol-triazine chromophore (TRTC)-based ultraviolet screening agent, or the hydroxyl-phenyl-benzotriazole chromophore (HBC)-based ultraviolet screening agent may be used alone or in a mixture of two or more thereof.

The adhesive layer and the coating layer may comprise the ultraviolet screening agent in an amount of 0.01 wt % to 10 wt % or 0.05 wt % to 7 wt % based on the total weight of the coating layer or the adhesive layer.

Light transmittance of the adhesive layer and the coating layer may be adjusted according to the brightness range of the liquid crystal display, but, specifically, the adhesive layer and the coating layer may have a visible light transmittance of 30% to 90%, or 50% to 90%.

In addition, the white emitting device package of the backlight unit comprises a resin layer comprising K—Si—F-based phosphors, and a light emitting device emitting near ultraviolet ray or blue light, which may be used to excite the K—Si—F-based phosphors.

Figure 3:
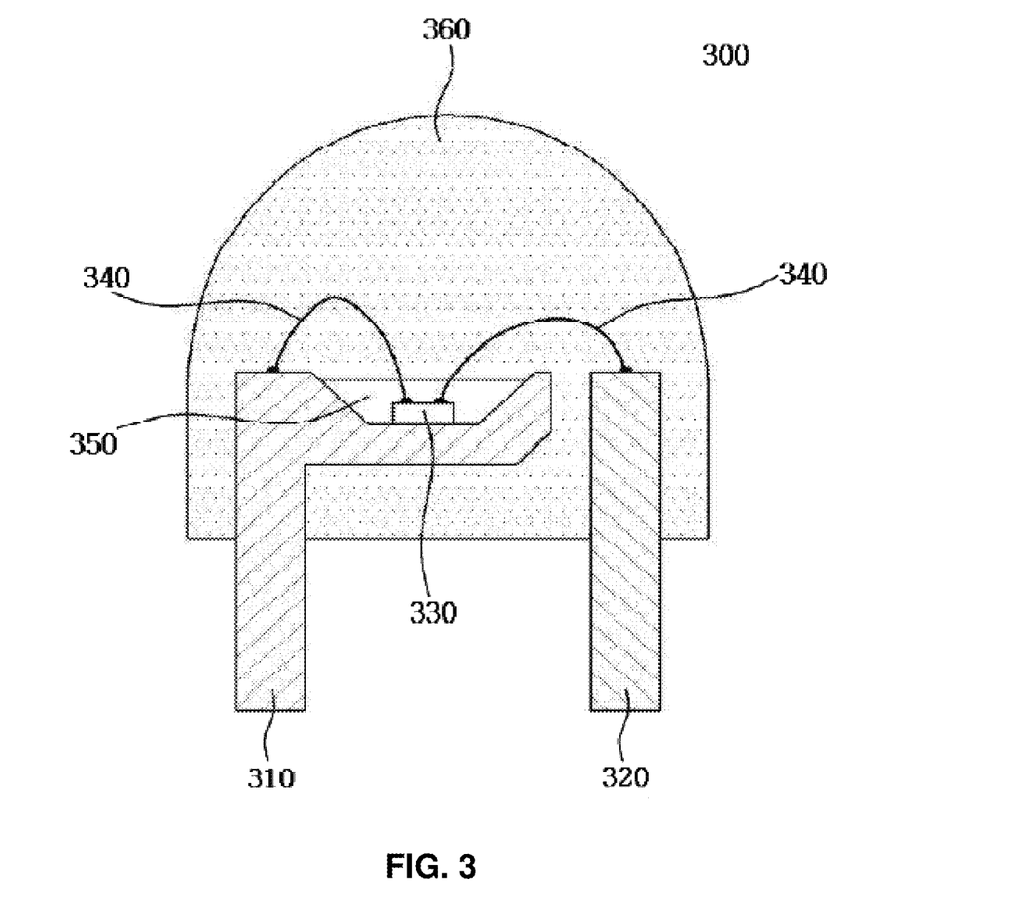
FIG. 3 is a schematic view illustrating a structure of a white emitting device package according to an embodiment of the present invention.

The schematic structure of the white emitting device package according to an embodiment of the present invention is illustrated in FIG. 3. In FIG. 3, a light emitting device 330 is schematically shown, and horizontal or vertical light emitting device may be used, and may be, e.g., a nitride semiconductor LED chip.

Figure 4:
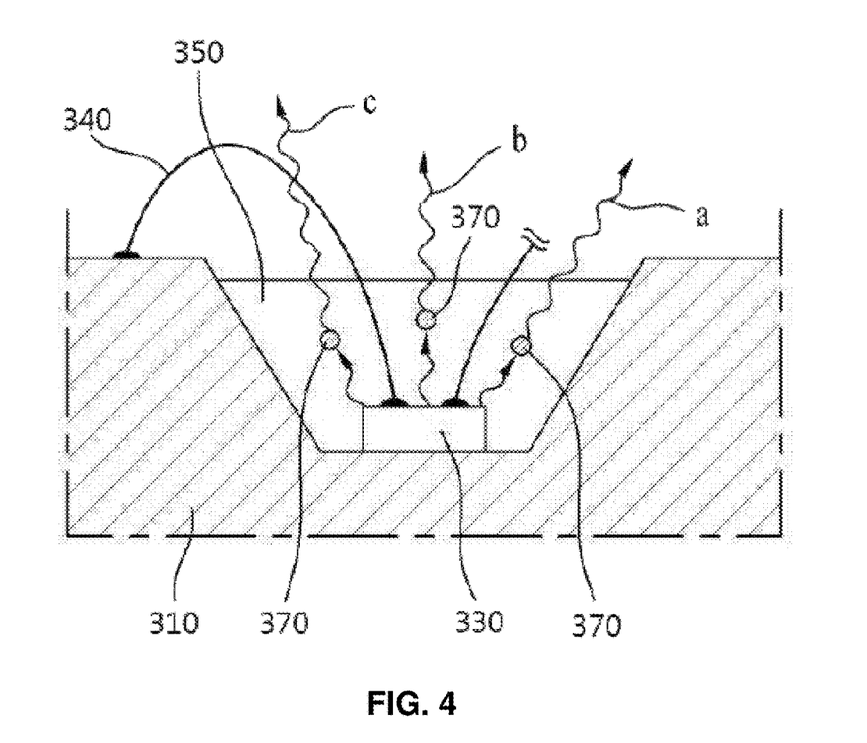
FIG. 4 illustrates a partially enlarged view of FIG. 3, which corresponds to a white emitting device package according to an embodiment of the present invention.

Referring to FIGS. 3 and 4, the white emitting device package 300 comprises a pair of lead frames 310 and 320, and a light emitting device 330 emitting light according to the application of a voltage.

The light emitting device 330 is electrically connected with the lead frames 310 and 320 via a wire 340, and on the light emitting device 330, a resin layer 350 comprising K—Si—F-based phosphors is molded and formed. The resin layer 350 may be formed via molding around the entire light emitting device 330, or molding around the light emitting part, if needed. That is, in a high power light emitting device, the light emitting device 330 may be large-sized. In this case, the molding of the entire device, may be unfavorable to the uniform dispersion of phosphors 370 in the light transmitting resin, and thus, the partial molding around the light emitting part may be favorable.

The light emitting device 330 may emit near ultraviolet ray or blue light, which is used to excite K—Si—F-based phosphors. In particular, the light emitting device may emit blue light in a wavelength region of 350 nm to 460 nm.

The resin layer 350 is formed via molding on the light emitting device and may comprise a light transmitting resin and K—Si—F-based phosphors 370 (see FIG. 4) dispersed in the light transmitting resin. The light transmitting resin may comprise at least one selected from the group consisting of an epoxy resin, a silicone resin, a polyimide resin, a urea resin and an acryl resin. Particularly, an epoxy resin or a silicone resin may be used.

The resin layer may comprise 0.01 to 20 parts by weight of the K—Si—F-based phosphors based on 100 parts by weight of the light transmitting resin. Particularly, 1 to 10 parts by weight of the K—Si—F-based phosphors may be comprised based on 100 parts by weight of the light transmitting resin.

The K—Si—F-based phosphor 370 may be a $K_2SiF_6$:Mn red phosphor. The $K_2SiF_6$:Mn indicates $K_2SiF_6$ doped with tetravalent manganese ($Mn^{4+}$) and means that tetravalent cationic silicon is partially substituted with manganese. In particular, $K_2SiF_6$ doped with tetravalent manganese may be represented by $K_2Si_{1-m}Mn_mF_6$, where m is 0.001 to 0.15, and particularly, 0.01 to 0.12.

In addition, the resin layer may further comprise various green phosphors, red phosphors, amber phosphors, and the combination thereof, if necessary, in addition to the K—Si—F-based phosphors.

Also, on the resin layer 350, an exterior material 360 may be provided for the external space of the device.

The white emitting device package may emit white light of wide wavelengths in a wavelength region of 420 to 700 nm.

Component layers of each of the backlight unit and the liquid crystal panel constituting the liquid crystal display of the present invention may have a material, a thickness, and a shape, which are commonly accepted in the art, and may be variously modified if necessary.

Thus, the liquid crystal display comprising the K—Si—F-based phosphors and the color gamut enhancing film of the present invention may provide enhanced color gamut and brightness by blocking unnecessary wavelengths other than pure RGB wavelengths while transmitting the pure RGB wavelengths emitted from a light source to a maximum, and may maximize a color gamut enhancing effect depending on display characteristics by freely moving the position of the color gamut enhancing film.

EXAMPLE

Hereinafter, the present invention is further illustrated by the following Examples, but not limited thereto.

Example 1

25 wt % of an acryl binder resin (GS1000, Soken) and 75 wt % of methyl ethyl ketone (MEK) were mixed to prepare a solution, and an absorption dye (SK-d593 SK Chemicals, main absorption wavelength band: 560 nm to 600 nm) was then added thereto in an amount of 0.05 parts by weight based on 100 parts by weight of the solution to prepare a coating layer composition.

Figure 5:
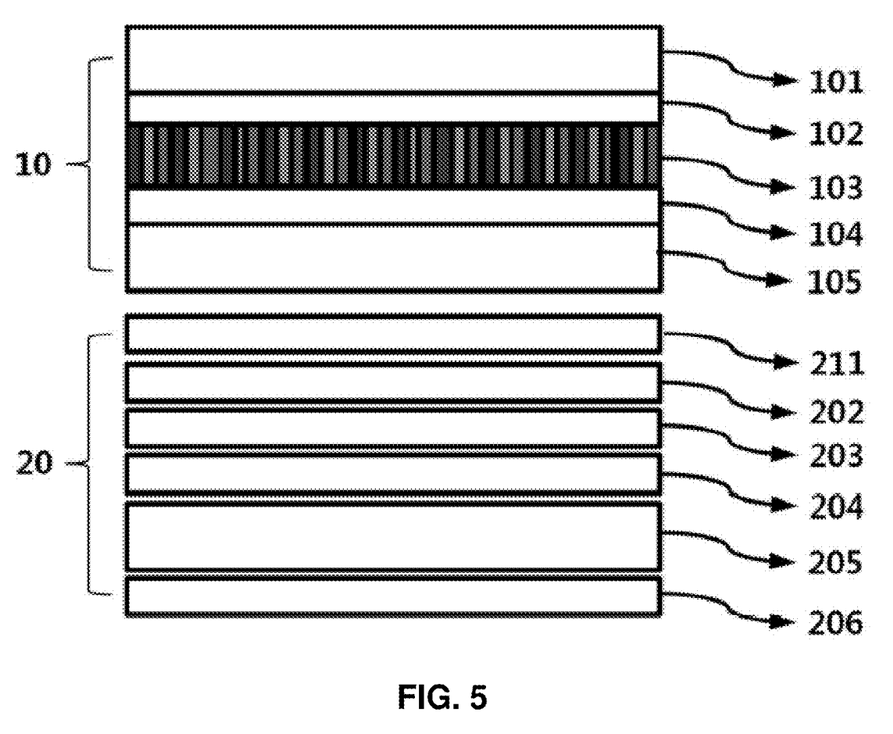
FIG. 5 is a schematic view illustrating a structure of a liquid crystal display according to Example 1.

One surface of a diffusion film (CH19 manufactured by SKC-HAAS) was coated with the coating layer composition by using a mayer bar and dried and cured to form a 5 μm thick coating layer (color gamut enhancing film), and the diffusion film comprising the coating layer formed thereon was employed as a lower diffusion sheet in a liquid crystal panel so that the coating layer faces a light guide plate to manufacture a liquid crystal display of the present invention (see FIG. 5).

In this case, a backlight unit with a white emitting device package (UN49KU7000FXKR manufactured by Samsung Electronics) comprising K—Si—F-based phosphors ($K_2SiF_6$:Mn) was used. Particularly, the backlight unit had a structure in which a dual brightness enhancement film, a horizontal prism film, a vertical prism film, a lower diffusion sheet, a light guide plate, and a reflective plate were sequentially stacked.

Comparative Example 1

A liquid crystal display of the same structure as Example 1 was manufactured, except for not forming a coating layer comprising an absorption dye on one side of a lower diffusion sheet, and using a backlight unit (55UB8400 manufactured by LG Electronics), to which a white emitting device package comprising YAG phosphor ($Y_3Al_5O_{12}$:Ce) was applied.

Comparative Example 2

A liquid crystal display of the same structure as Example 1 was manufactured, except for not forming a coating layer comprising an absorption dye on one side of a lower diffusion sheet (that is, a commercially available liquid crystal display without changing its structure).

Experimental Example 1

Figure 6:
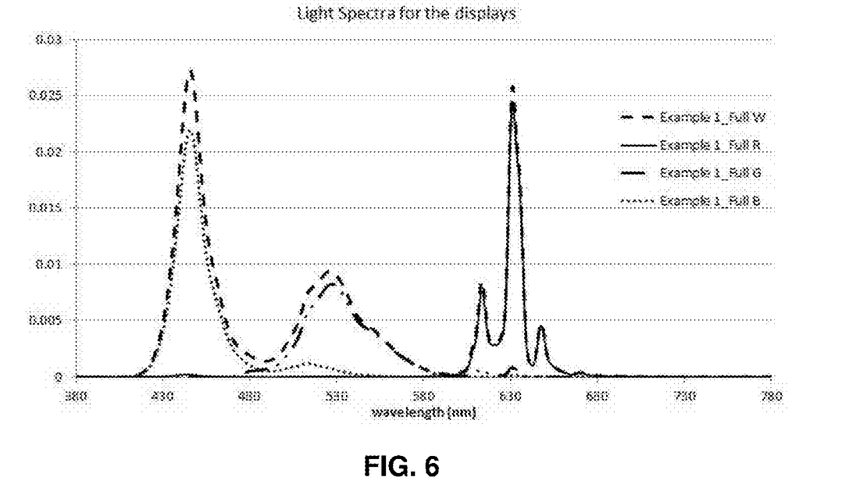
FIG. 6 is emission spectrum of liquid crystal displays according to Example 1.
Figure 7:
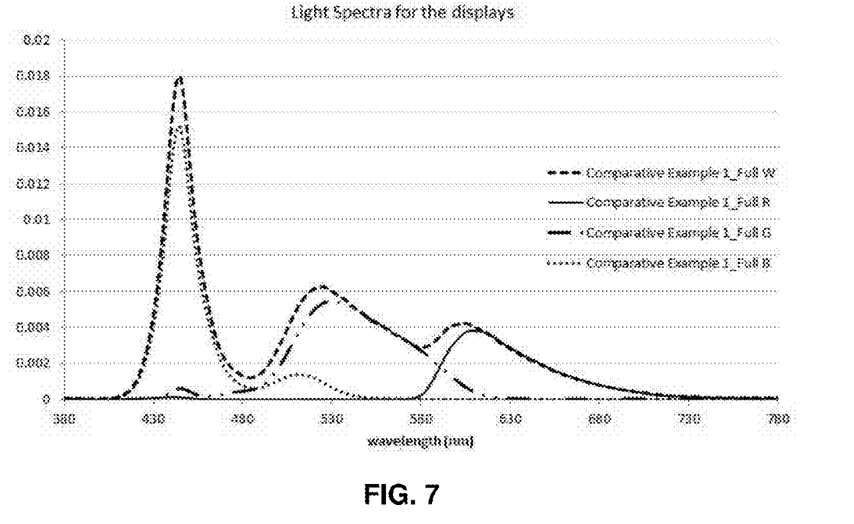
FIG. 7 is emission spectrum of liquid crystal displays according to Comparative Example 1.
Figure 8:
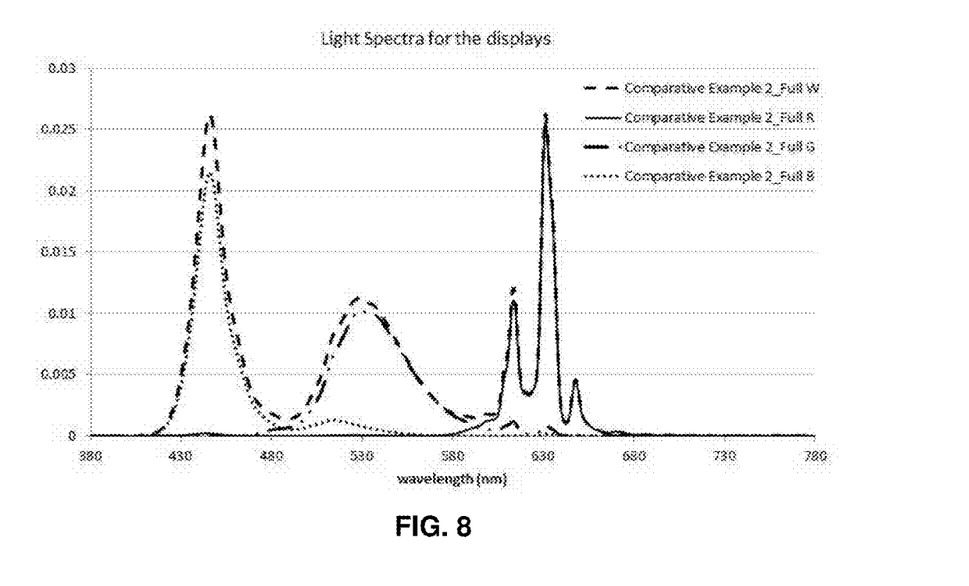
FIG. 8 is emission spectrum of liquid crystal displays according to Comparative Example 2.

Characteristics and changes in spectrum were measured for the liquid crystal displays manufactured in Example 1 and Comparative Examples 1 and 2 by using a radiometer (CS-2000, Minolta Co., Ltd.) and the results thereof are presented in Table 1 and FIGS. 6 to 8. A color gamut indicates a color reproduction area.

TABLE 1

|  |  | Comparative Example 1 | Comparative Example 2 | Example 1 |
|---|---|---|---|---|
| Full W | x | 0.2741 | 0.2748 | 0.2522 |
|  | y | 0.2704 | 0.2746 | 0.2243 |
| Full R | x | 0.6438 | 0.6699 | 0.6757 |
|  | y | 0.3341 | 0.3088 | 0.2971 |
| Full G | x | 0.3052 | 0.2702 | 0.2349 |
|  | y | 0.6040 | 0.6756 | 0.6903 |
| Full B | x | 0.1543 | 0.1563 | 0.1556 |
|  | y | 0.0571 | 0.0512 | 0.0444 |
| Full W | u' | 0.0716 | 0.0716 | 0.0734 |
|  | v' | 0.4272 | 0.4301 | 0.3892 |
| Full R | u' | 0.4501 | 0.4994 | 0.5184 |
|  | v' | 0.5256 | 0.5179 | 0.5129 |
| Full G | u' | 0.1267 | 0.1023 | 0.0869 |
|  | v' | 0.5640 | 0.5754 | 0.5745 |
| Full B | u' | 0.1829 | 0.1894 | 0.1932 |
|  | v' | 0.1521 | 0.1396 | 0.1240 |
| Color gamut (based on CIE1976) | DCI overlap ratio | 75.8% | 94.4% | 95.5% |
|  | BT.2020 overlap ratio | 55.3% | 74.7% | 81.3% |

As illustrated in Table 1, the liquid crystal displays of Comparative Example 2 and Example 1, which comprise the K—Si—F-based phosphors exhibited improved color gamut than the liquid crystal display of Comparative Example 1, which comprised YAG phosphors. However, the liquid crystal display of Example 1, which comprises a color gamut enhancing film in addition to the K—Si—F-based phosphors exhibited improved color gamut when compared with the liquid crystal display of Comparative Example 2. Accordingly, the liquid crystal display comprising the color gamut enhancing film of the present invention is expected to satisfy DCI or BT.2020 standard, which is used as UHD standard.

| Explanation of Mark | |
|---|---|
| 10: liquid crystal panel | 101: upper polarizing plate |
| 102: first adhesive layer | 103: liquid crystal cell |
| 104: second adhesive layer | 105: lower polarizing plate |
| 20: backlight unit | |
| 211: dual brightness enhancement film (DBEF) | |
| 221: upper diffusion sheet | 202: upper diffusion sheet |
| 203: vertical prism sheet | 204: lower diffusion sheet |
| 205: light guide plate | 206: reflective plate |
| 221-1: first beads | 221-2: diffusion coating layer |
| 221-3: diffusion sheet base material | 221-4: bead coating layer |
| 221-5: second beads | 202-1: prism pattern layer |
| 202-2: prism sheet base material | 202-3: rear coating layer |
| 202-4: third beads | 206-1: fourth beads |
| 206-2: front coating layer | 206-3: reflective plate base material |
| 300: white emitting device package | 310, 320: lead frame |
| 330: light emitting device | 340: wire |
| 350: resin layer | 360: exterior material |
| 370: the K—Si—F-based phosphors | a, b, c: light |

What is claimed is:

1. A liquid crystal display comprising a backlight unit and a liquid crystal panel,
   wherein the backlight unit comprises a white emitting device package comprising K—Si—F-based phosphors, and
   the backlight unit, the liquid crystal panel, or both of the backlight unit and the liquid crystal panel comprise one or more of a coating layer or an adhesive layer, where the one or more of the coating layer or the adhesive layer comprise at least one type of an absorption dye configured to absorb a specific wavelength band,
   wherein the absorption dye is comprised in an amount of 0.01 wt % to 10 wt % based on the total weight of the coating layer or the adhesive layer.

2. The liquid crystal display of claim 1, wherein the liquid crystal panel sequentially comprises an upper polarizing plate, a first adhesive layer, a liquid crystal cell, a second adhesive layer, and a lower polarizing plate, and
   the first adhesive layer, the second adhesive, or both of them comprise at least one type of an absorption dye configured to absorb a specific wavelength band.

3. The liquid crystal display of claim 1, wherein the backlight unit sequentially comprises a dual brightness enhancement film (DBEF) or an upper diffusion sheet, a prism sheet, a lower diffusion sheet, a light guide plate, and a reflective plate, and
   the backlight unit comprises a coating layer on at least one position of one side or both sides of the dual brightness enhancement film or the upper diffusion sheet, one side or both sides of the prism sheet, one side or both sides of the lower diffusion sheet, one side or both sides of the light guide plate, and one side of the reflective plate,
   wherein the coating layer comprises at least one type of an absorption dye configured to absorb a specific wavelength band.

4. The liquid crystal display of claim 1, wherein the absorption dye has a main absorption wavelength band other than RGB.

5. The liquid crystal display of claim 1, wherein the absorption dye has a main absorption wavelength band of 380 nm to 430 nm, 480 nm to 510 nm, or 560 nm to 600 nm.

6. The liquid crystal display of claim 1, wherein the absorption dye is selected from the group consisting of a hydroxy benzotriazole (HB)-based dye, a tris-resorcinol-triazine chromophore (TRTC)-based dye, a hydroxylphenyl-benzotriazole chromophore (HBC)-based dye, a pyrrole methine-based dye, a rhodamine-based dye, a boron dipyrromethene-based dye, a tetraaza porphyrin-based dye, a squaraine-based dye, and a cyanine-based dye.

7. The liquid crystal display of claim 6, wherein the absorption dye is selected from the group consisting of the hydroxy benzotriazole-based dye, the cyanine-based dye, the pyrrole methine-based dye, and the tetraaza porphyrin-based dye.

8. The liquid crystal display of claim 7, wherein the absorption dye is a combination of the hydroxy benzotriazole-based dye, the cyanine-based dye, and the tetraaza porphyrin-based dye.

9. The liquid crystal display of claim 1, wherein the coating layer or the adhesive layer has a thickness of 2 to 100 μm.

10. The liquid crystal display of claim 1, wherein the white emitting device package comprises:
 a resin layer comprising K—Si—F-based phosphors; and
 a light emitting device emitting near ultraviolet ray or blue light for exciting the K—Si—F-based phosphors.

11. The liquid crystal display of claim 10, wherein the resin layer is formed via molding on the light emitting device, and the resin layer comprises a light transmitting resin and the K—Si—F-based phosphors dispersed in the light transmitting resin.

12. The liquid crystal display of claim 11, wherein the light transmitting resin is at least one selected from the group consisting of an epoxy resin, a silicone resin, a polyimide resin, a urea resin and an acryl resin.

13. The liquid crystal display of claim 11, wherein the resin layer comprises 0.01 to 20 parts by weight of the K—Si—F-based phosphors based on 100 parts by weight of the light transmitting resin.

14. The liquid crystal display of claim 10, wherein the K—Si—F-based phosphor is a $K_2SiF_6$:Mn red phosphor.

15. The liquid crystal display of claim 14, wherein the light emitting device emits blue light in a wavelength region of 350 to 460 nm, and the white emitting device package emits white light in a wavelength region of 420 to 700 nm.

\* \* \* \* \*